(12) United States Patent
Han

(10) Patent No.: US 12,000,588 B2
(45) Date of Patent: Jun. 4, 2024

(54) FUEL NOZZLE, FUEL NOZZLE MODULE HAVING THE SAME, AND COMBUSTOR

(71) Applicant: DOOSAN ENERBILITY CO., LTD., Changwon-si (KR)

(72) Inventor: Dong Sik Han, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/550,113

(22) Filed: Dec. 14, 2021

(65) Prior Publication Data

US 2022/0221152 A1    Jul. 14, 2022

(30) Foreign Application Priority Data

Jan. 11, 2021  (KR) .......................... 10-2021-0003238

(51) Int. Cl.
*F23R 3/28* (2006.01)
*F02C 3/22* (2006.01)

(52) U.S. Cl.
CPC .............. *F23R 3/286* (2013.01); *F02C 3/22* (2013.01); *F23R 2900/00014* (2013.01)

(58) Field of Classification Search
CPC ............ F23R 3/286; F23R 2900/00014; F23R 3/34–346; F05D 2260/96; F05D 2260/963–964; F02C 7/22–222
See application file for complete search history.

(56) References Cited

U.S. PATENT DOCUMENTS

| | | | |
|---|---|---|---|
| 8,112,999 B2 | 2/2012 | Zuo | |
| 8,616,002 B2* | 12/2013 | Kraemer | F23N 5/082 60/737 |
| 8,801,428 B2* | 8/2014 | Melton | F23D 14/62 60/737 |
| 9,004,912 B2 | 4/2015 | Stoia | |
| 9,353,950 B2* | 5/2016 | Uhm | F23R 3/10 |
| 2011/0197587 A1* | 8/2011 | Zuo | F23D 14/02 239/398 |
| 2012/0180487 A1* | 7/2012 | Uhm | F23R 3/286 60/737 |

(Continued)

FOREIGN PATENT DOCUMENTS

| | | |
|---|---|---|
| JP | 2011027395 A | 2/2011 |
| JP | 2013181744 A | 9/2013 |

(Continued)

OTHER PUBLICATIONS

KR Office Action dated Apr. 26, 2022.

*Primary Examiner* — Katheryn A Malatek
*Assistant Examiner* — Jingchen Liu
(74) *Attorney, Agent, or Firm* — Harvest IP Law, LLP

(57) ABSTRACT

A fuel nozzle, a fuel nozzle module having the same, and a combustor having the same, which can solve a problem of combustion instability due to a high-frequency resonance generated by fuel containing hydrogen are provided. The fuel nozzle includes a fuel flow path through which a fuel flows, and a plurality of fuel plenums including a plurality of micro-mixers including a mixing flow path through which a fluid in which the fuel and compressed air are mixed flows and a fuel supply hole for supplying the fuel to the mixing flow path, wherein the plurality of fuel plenums are formed in the fuel flow path to be spaced apart from each other.

16 Claims, 10 Drawing Sheets

(56) References Cited

U.S. PATENT DOCUMENTS

| | | | | |
|---|---|---|---|---|
| 2012/0198856 A1* | 8/2012 | Uhm | .................... | F23M 20/005 |
| | | | | 60/737 |
| 2013/0122434 A1* | 5/2013 | Stoia | ....................... | F23R 3/283 |
| | | | | 431/12 |
| 2014/0033718 A1* | 2/2014 | Manoharan | ............... | F23R 3/10 |
| | | | | 60/725 |

FOREIGN PATENT DOCUMENTS

| | | | |
|---|---|---|---|
| JP | 5379655 | B2 | 12/2013 |
| JP | 5571495 | B2 | 8/2014 |
| JP | 6059426 | B2 | 1/2017 |
| JP | 6134529 | B2 | 5/2017 |
| JP | 6931982 | B2 | 9/2021 |
| KR | 101110144 | B1 | 2/2012 |
| KR | 102190537 | B1 | 12/2020 |

\* cited by examiner (R1 < R2)

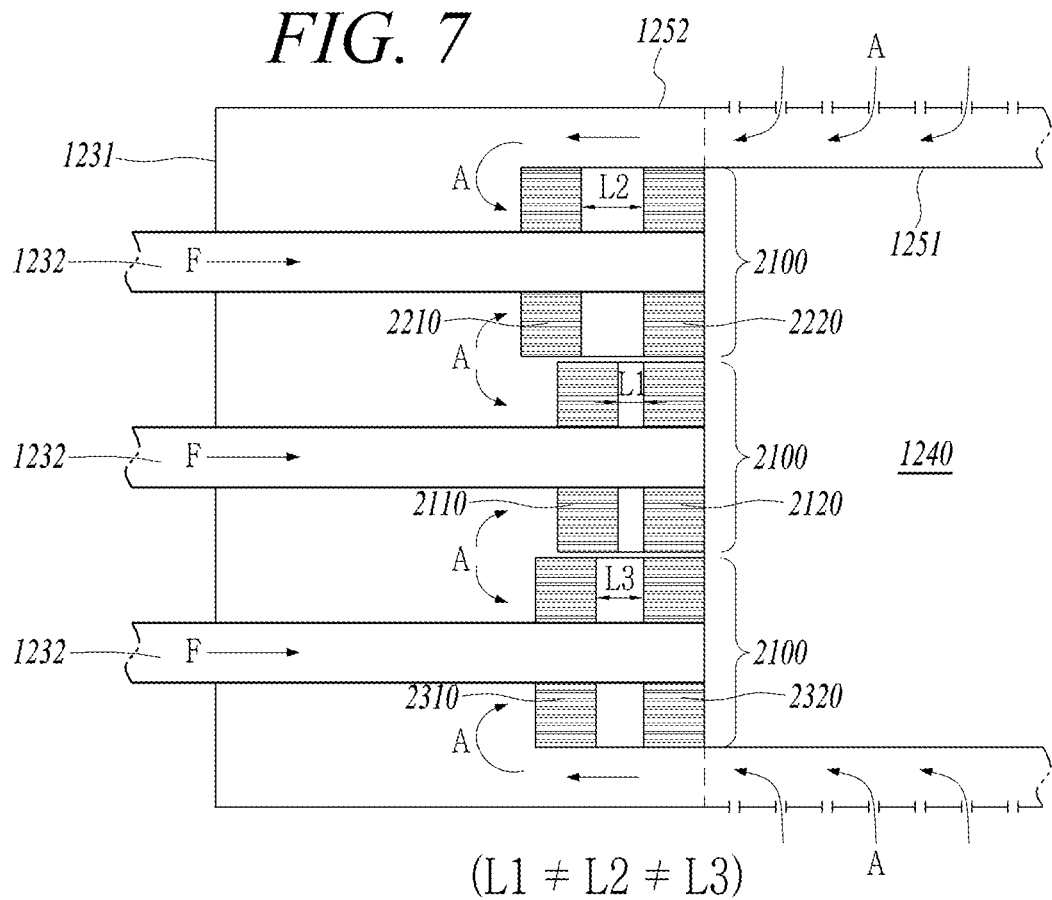

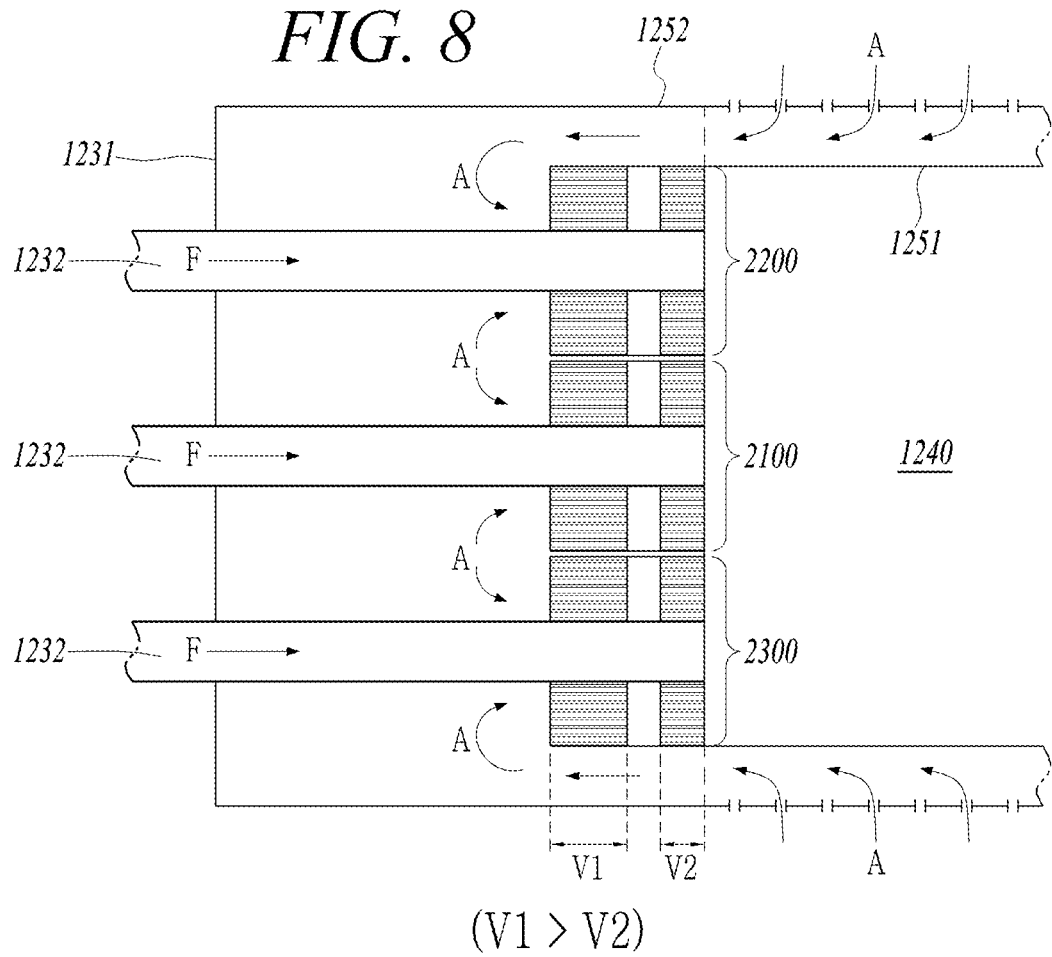

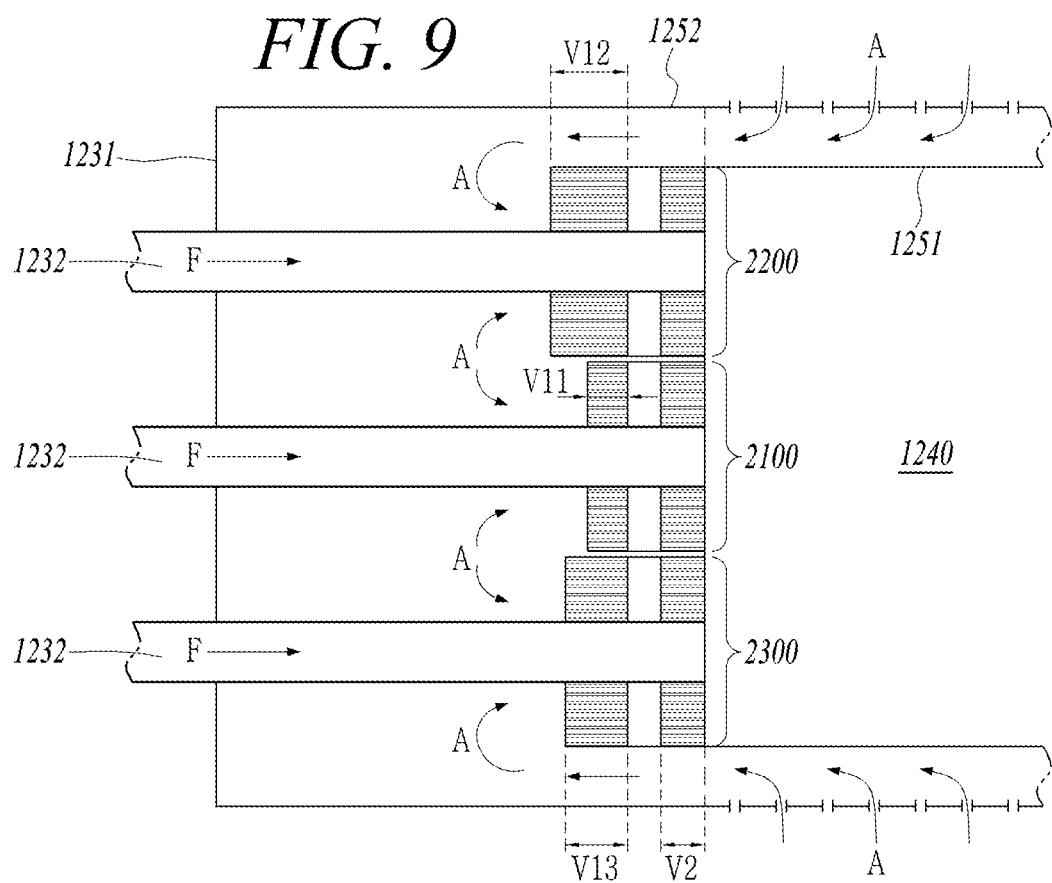

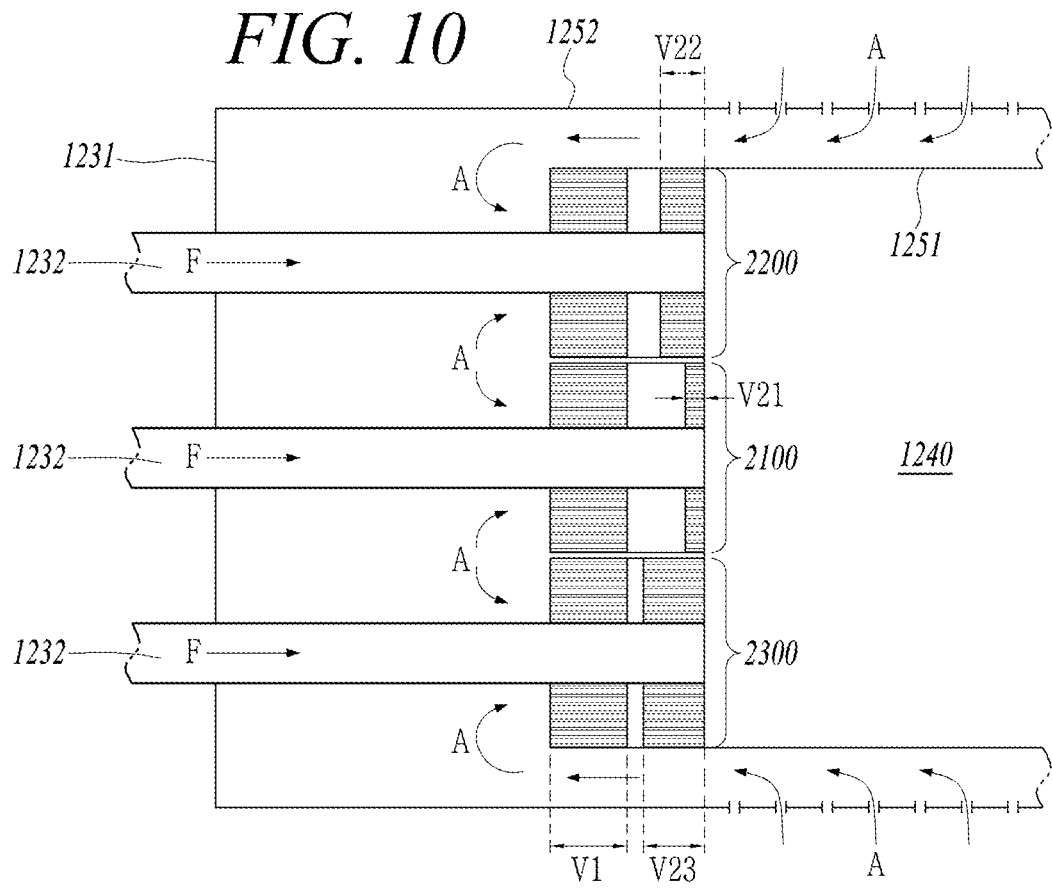

FUEL NOZZLE, FUEL NOZZLE MODULE HAVING THE SAME, AND COMBUSTOR

CROSS-REFERENCE TO RELATED APPLICATION

This application claims priority to Korean Patent Application No. 10-2021-0003238, filed on Jan. 11, 2021, the disclosure of which is incorporated by reference herein in its entirety.

BACKGROUND

Field

Apparatuses and methods consistent with exemplary embodiments relate to a fuel nozzle, a fuel nozzle module having the same, and a combustor.

Description of the Related Art

A gas turbine is a power engine configured to mix and combust compressed air compressed by a compressor with fuel and rotate a turbine with a high-temperature gas generated by combustion. The gas turbine is used to drive a generator, an aircraft, a ship, a train, or the like.

The gas turbine includes a compressor, a combustor, and a turbine. The compressor sucks and compresses external air and delivers the compressed air to the combustor. The air compressed by the compressor is in a high-pressure and high-temperature state. The combustor mixes the compressed air compressed by the compressor with fuel and combusts the mixture to produce combustion gas which is discharged to the turbine. A turbine blade in the turbine is rotated by the combusted gas to generate power. The generated power is used in various fields such as power generation and driving of a mechanical device.

SUMMARY

Aspects of one or more exemplary embodiments provide a fuel nozzle, a fuel nozzle module having the same, and a combustor, which can solve a problem of combustion instability caused by a high-frequency resonance in fuel containing hydrogen.

Additional aspects will be set forth in part in the description which follows and, in part, will become apparent from the description, or may be learned by practice of the exemplary embodiments.

According to an aspect of an exemplary embodiment, there is provided a fuel nozzle including: a fuel flow path through which a fuel flows, and a plurality of fuel plenums including a plurality of micro-mixers including a mixing flow path through which a fluid in which the fuel and compressed air are mixed flows and a fuel supply hole for supplying the fuel to the mixing flow path, wherein the plurality of fuel plenums are formed in the fuel flow path to be spaced apart from each other.

The plurality of fuel plenums can include a first fuel plenum formed upstream of fuel flow and a second fuel plenum formed downstream of the fuel flow, and a diameter of a first mixing flow path constituting the first fuel plenum may be different from a diameter of a second mixing flow path constituting the second fuel plenum.

The diameter of the first mixing flow path can be smaller than the diameter of the second mixing flow path.

Each of the plurality of fuel plenums can include a plenum inlet for flowing the fuel into the fuel plenum, and sizes of the plenum inlets of each of the plurality of fuel plenums may be different.

The fuel may be a fuel including hydrogen.

According to an aspect of another exemplary embodiment, there is provided a fuel nozzle module including: a plurality of fuel nozzles, and a shroud formed to surround the plurality of fuel nozzles, each of the plurality of fuel nozzles can include a fuel flow path through which a fuel flows, and a plurality of fuel plenums including a plurality of micro-mixers including a mixing flow path through which a fluid in which the fuel and compressed air are mixed flows and a fuel supply hole for supplying the fuel to the mixing flow path, wherein the plurality of fuel plenums can be formed in the fuel flow path to be spaced apart from each other.

At least two of the plurality of fuel nozzles can include the plurality of fuel plenums formed in the fuel flow path to be spaced apart from each other, each of the plurality of fuel plenums can include a first fuel plenum formed upstream of fuel flow and a second fuel plenum formed downstream of the fuel flow, and an interval between the first fuel plenum and the second fuel plenum constituting one of the plurality of fuel nozzles can be different from an interval between the first fuel plenum and the second fuel plenum constituting the other fuel nozzles.

At least two of the plurality of fuel plenums can be formed to have different volumes.

At least two of the plurality of fuel nozzles can include the plurality of fuel plenums formed in the fuel flow path to be spaced apart from each other, each of the plurality of fuel plenums can include a first fuel plenum formed upstream of fuel flow and a second fuel plenum formed downstream of the fuel flow, and at least one of a volume of the first fuel plenum and a volume of the second fuel plenum constituting one of the plurality of fuel nozzles can be different from a volume of the first fuel plenum or a volume of the second fuel plenum constituting the other fuel nozzles.

The plurality of fuel plenums can include a first fuel plenum formed upstream of fuel flow and a second fuel plenum formed downstream of the fuel flow, and a diameter of a first mixing flow path constituting the first fuel plenum can be smaller than a diameter of a second mixing flow path constituting the second fuel plenum.

Each of the plurality of fuel plenums can include a plenum inlet for flowing the fuel into the fuel plenum, and sizes of the plenum inlets of each of the plurality of fuel plenums may be different.

The fuel may be a fuel including hydrogen.

According to an aspect of another exemplary embodiment, there is provided a combustor including: a combustion chamber assembly including a combustion chamber in which a mixing fluid is combusted, and a fuel nozzle module including a plurality of fuel nozzles for injecting the mixing fluid into the combustion chamber and a shroud formed to surround the plurality of fuel nozzles, each of the plurality of fuel nozzles includes a fuel flow path through which a fuel flows, and a plurality of fuel plenums including a plurality of micro-mixers including a mixing flow path through which a fluid in which the fuel and compressed air are mixed flows and a fuel supply hole for supplying the fuel to the mixing flow path, wherein the plurality of fuel plenums can be formed in the fuel flow path to be spaced apart from each other.

At least two of the plurality of fuel nozzles can include the plurality of fuel plenums formed in the fuel flow path to be spaced apart from each other, each of the plurality of fuel plenums can include a first fuel plenum formed upstream of fuel flow and a second fuel plenum formed downstream of the fuel flow, and an interval between the first fuel plenum and the second fuel plenum constituting one of the plurality of fuel nozzles including the plurality of fuel plenums can be different from an interval between the first fuel plenum and the second fuel plenum constituting the other fuel nozzles.

At least two of the plurality of fuel plenums can be formed to have different volumes.

At least two of the plurality of fuel nozzles can include the plurality of fuel plenums formed in the fuel flow path to be spaced apart from each other, each of the plurality of fuel plenums can include a first fuel plenum formed upstream of fuel flow and a second fuel plenum formed downstream of the fuel flow, and at least one of a volume of the first fuel plenum and a volume of the second fuel plenum constituting one of the plurality of fuel nozzles can be different from a volume of the first fuel plenum or a volume of the second fuel plenum constituting the other fuel nozzles.

The plurality of fuel plenums can include a first fuel plenum formed upstream of fuel flow and a second fuel plenum formed downstream of the fuel flow, and a diameter of a first mixing flow path constituting the first fuel plenum can be smaller than a diameter of a second mixing flow path constituting the second fuel plenum.

Each of the plurality of fuel plenums can include a plenum inlet for flowing the fuel into the fuel plenum, and sizes of the plenum inlets of each of the plurality of fuel plenums may be different.

The fuel can be a fuel including hydrogen.

According to one or more exemplary embodiments, it is possible to solve the problem of combustion instability due to the high-frequency resonance generated by fuel containing hydrogen.

BRIEF DESCRIPTION OF THE DRAWINGS

The above and other aspects will become more apparent from the following description of the exemplary embodiments with reference to the accompanying drawings, in which:

FIGS. 7 to 10 are cross-sectional diagrams showing various forms of a fuel nozzle module according to another exemplary embodiment.

DETAILED DESCRIPTION

Figure 1:
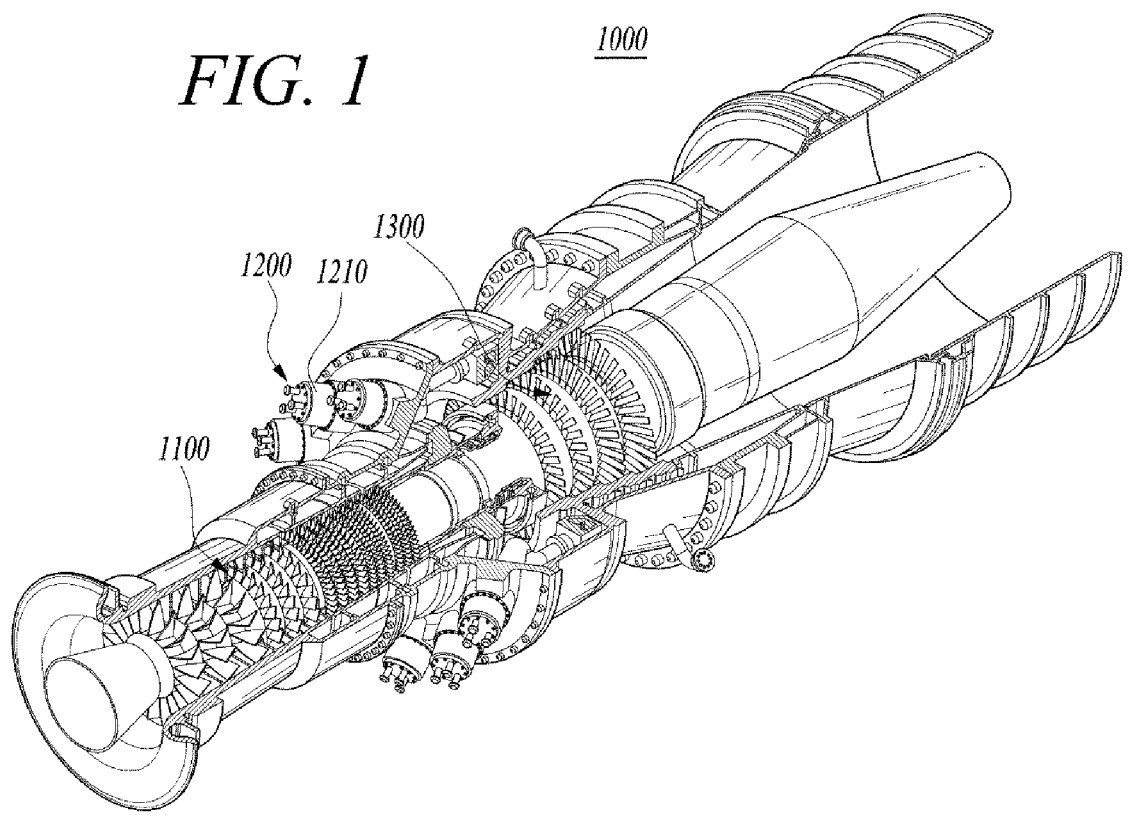
FIG. 1 is a diagram showing an interior of a gas turbine according to an exemplary embodiment.

Various changes and various embodiments will be described in detail with reference to the accompanying drawings. It should be understood, however, that the various embodiments are not for limiting the scope of the disclosure to the specific embodiment, but they should be interpreted to include all modifications, equivalents, and alternatives of the embodiments included within the sprit and scope disclosed herein.

The terms used herein are used to describe only a specific exemplary embodiment, and are not intended to limit the scope of the disclosure. The singular forms include the plural forms unless the context clearly indicates otherwise. In the present disclosure, it should be understood that the terms "comprises" or "includes," etc. specify the presence of features, integers, steps, operations, components, parts or a combination thereof described in the specification, but do not preclude the presence or addition possibility of one or more other features, integers, steps, operations, components, parts or a combination thereof.

Hereinafter, exemplary embodiments will be described in detail with reference to the accompanying drawings. It is noted that like reference numerals refer to like parts throughout the various figures and exemplary embodiments. In certain embodiments, a detailed description of known functions and configurations that may obscure the gist of the present disclosure will be omitted. For the same reason, some of the elements in the drawings are exaggerated, omitted, or schematically illustrated.

Figure 2:
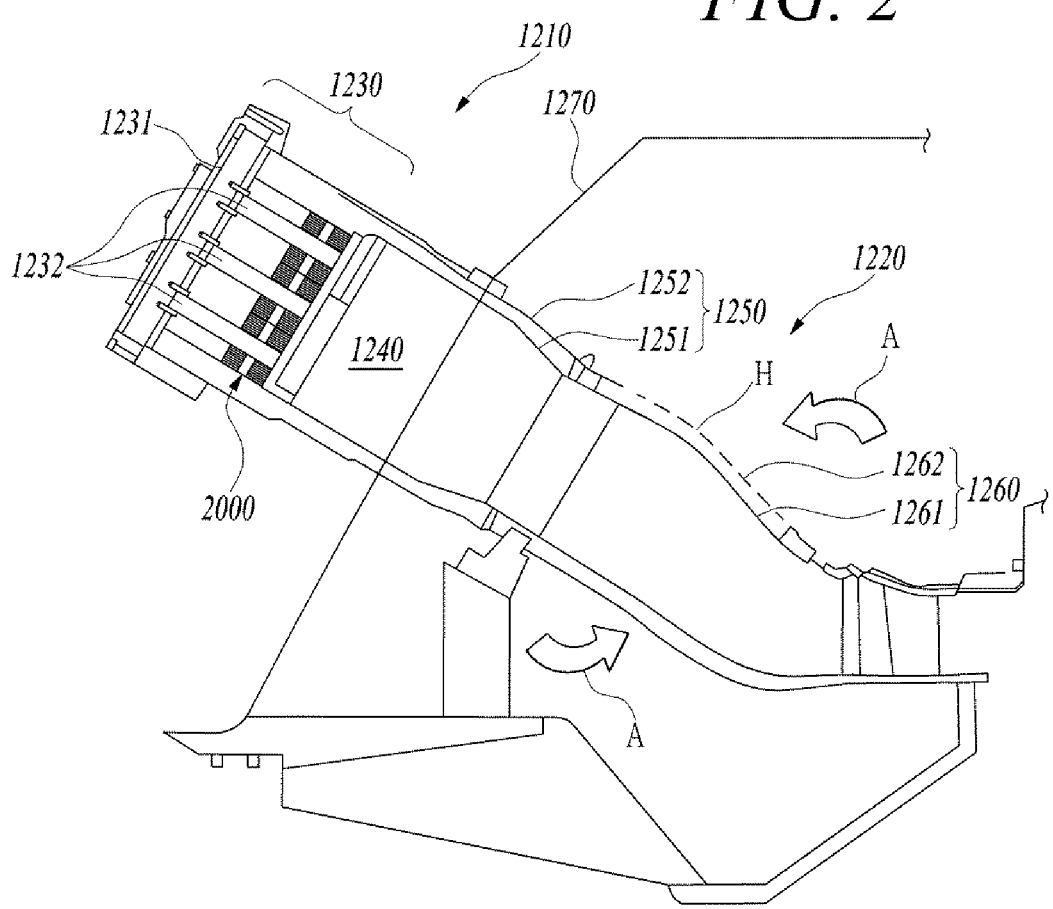
FIG. 2 is a diagram showing a burner module constituting a combustor according to an exemplary embodiment.
Figure 3:
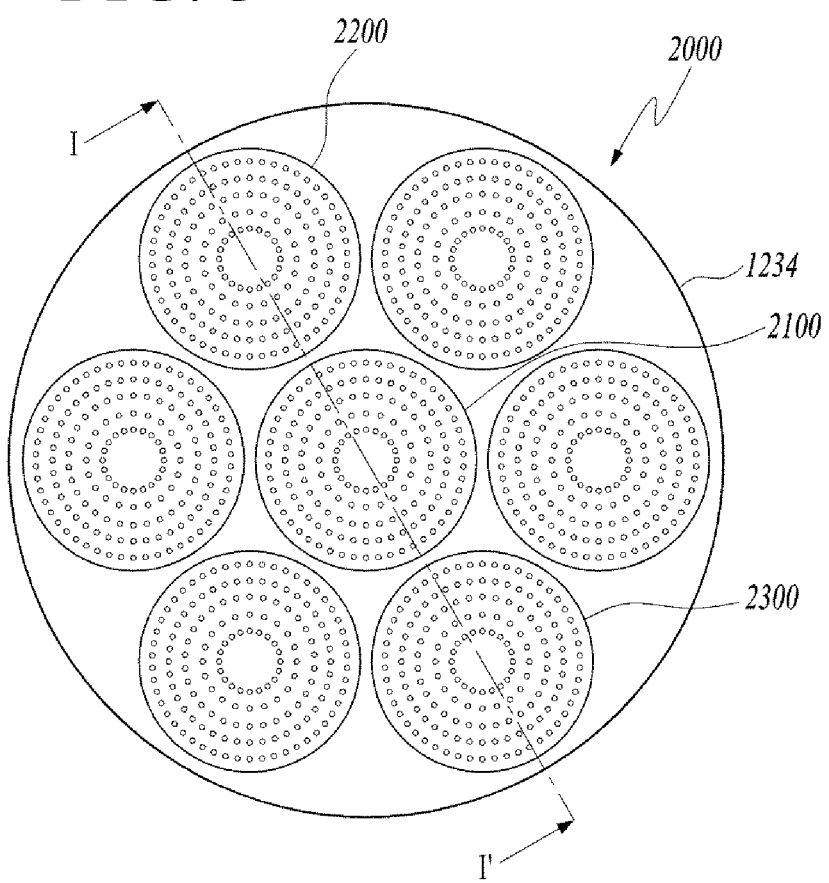
FIG. 3 is a diagram showing a lower surface of the burner module according to an exemplary embodiment.

FIG. 1 is a diagram showing an interior of a gas turbine according to an exemplary embodiment, FIG. 2 is a diagram showing a burner module constituting a combustor according to an exemplary embodiment, and FIG. 3 is a diagram showing a lower surface of the burner module according to an exemplary embodiment.

Referring to FIGS. 1 to 3, a gas turbine 1000 includes a compressor 1100 configured to compress introduced air at high pressure, a combustor 1200 configured to mix the compressed air compressed by the compressor 1100 with fuel to combust the mixture, and a turbine 1300 configured to generate a rotation force with a combustion gas generated by the combustor 1200. Here, an upstream and a downstream are defined based on a front and rear of fuel or air flow.

A thermodynamic cycle of the gas turbine can ideally comply with the Brayton cycle. The Brayton cycle is composed of four processes: isentropic compression (i.e., an insulation compression) process, static pressure rapid heat process, isentropic expansion (i.e., an insulation expansion) process, and static pressure heat dissipation process. That is, in the Brayton cycle, thermal energy may be released by combustion of fuel in the static pressure environment after ambient air is sucked and compressed at high pressure, the high-temperature combusted gas is expanded and converted into kinetic energy, and an exhaust gas with remaining energy is emitted to the atmosphere. As such, the cycle is composed of four processes: compression, heating, expansion, and heat-dissipation.

The gas turbine 1000 employing the Brayton cycle includes the compressor 1100, the combustor 1200, and the turbine 1300. Although the following description will be described with reference to FIG. 1, the present disclosure may be widely applied to other turbine engines having similar configurations to the gas turbine 1000 illustrated in FIG. 1.

Referring to FIG. 1, the compressor 1100 of the gas turbine may suck and compress air to supply the air for combustion to the combustor 1200 and to supply the air for cooling to a high-temperature region of the gas turbine that is required to be cooled. Because the sucked air is compressed in the compressor 1100 through an insulation compression process, the pressure and temperature of the air passing through the compressor 1100 increase.

The compressor 1100 may be designed in a form of a centrifugal compressor or an axial compressor, and the centrifugal compressor is applied to a small gas turbine whereas a multistage axial compressor is applied to a large gas turbine illustrated in FIG. 1 to compress a large amount of air.

The compressor 1100 is driven using a part of the power output from the turbine 1300. To this end, as shown in FIG. 1, a rotary shaft of the compressor 1100 and a rotary shaft of the turbine 1300 are directly connected. In the case of the large gas turbine 1000, almost half of the output produced by the turbine 1300 may be consumed to drive the compressor 1100. Accordingly, improving the efficiency of the compressor 1100 has a direct effect on improving the overall efficiency of the gas turbine 1000.

The combustor 1200 mixes the compressed air supplied from an outlet of the compressor 110 with fuel to combust the mixture at constant pressure to generate a combustion gas with high energy. The combustor 1200 is disposed on the downstream of the compressor 1100 and includes a plurality of burner modules 1210 annually disposed around the rotary shaft.

Referring to FIG. 2, the burner module 1210 can include a combustion chamber assembly 1220 including a combustion chamber 1240 in which fuel fluid is combusted, and a fuel nozzle assembly 1230 including a fuel nozzle module 2000 that injects the fuel fluid into the combustor chamber 1240.

The gas turbine 1000 may use gas fuel including hydrogen or natural gas, liquefied fuel, or composite fuel that is a combination thereof. In order to create a combustion environment to reduce the amount of emissions such as carbon monoxide or nitrogen oxides, a gas turbine has a recent tendency to apply a premixed combustion scheme that is advantageous in reducing emissions through lowered combustion temperature and homogeneous combustion even though it is difficult to control the premixed combustion.

For the premix combustion, the compressed air introduced from the compressor 1100 is mixed with fuel in advance in the fuel nozzle assembly 1230, and then enters the combustion chamber 1240. When a premix gas is initially ignited by an igniter, and then combustion state is stabilized, the combustion state is maintained by supplying fuel and air.

The fuel nozzle assembly 1230 can include a fuel nozzle module 2000 including a plurality of fuel nozzles 2100, 2200, and 2300. The plurality of fuel nozzles 2100, 2200, and 2300 mix fuel with air at an appropriate rate to form a fuel-air mixture having conditions suitable for combustion. The plurality of fuel nozzles 2100, 2200, and 2300 can be implemented in a micro-mixed type.

The combustion chamber assembly 1220 includes the combustion chamber 1240 in which combustion is performed, a liner 1250 and a transition piece 1260.

The liner 1250 disposed on a downstream side of the fuel nozzle assembly 1230 may have a dual structure of an inner liner 1251 and an outer liner 1252 in which the inner liner 1251 is surrounded by the outer liner 1252. In this case, the inner liner 1251 is a hollow tubular member, and an internal space of the inner liner 1251 forms the combustion chamber 1240. The inner liner 1251 is cooled by the compressed air introduced into an annular space inside the outer liner 1252 through a compressed air introduction hole (H).

The transition piece 1260 is disposed on a downstream side of the liner 1250 to guide the combustion gas generated in the combustion chamber 1240 to the turbine 1300 at high speed. The transition piece 1260 may have a dual structure of an inner transition piece 1261 and an outer transition piece 1262 in which the inner transition piece 1261 is surrounded by the outer transition piece 1262. The inner transition piece 1261 is also formed of a hollow tubular member such that a diameter thereof gradually decreases from the liner 1250 toward the turbine 1300. In this case, the inner liner 1251 and the inner transition piece 1261 can be coupled to each other by a plate spring seal. Because respective ends of the inner liner 1251 and the inner transition piece 1261 are fixed to the combustor 1200 and the turbine 1300, respectively, the plate spring seal may have a structure capable of accommodating expansion of length and diameter by thermal expansion to support the inner liner 1251 and the inner transition piece 1261.

As such, the inner liner 1251 and the inner transition piece 1261 have a structure surrounded by the outer liner 1252 and the outer transition piece 1262, respectively, so that the compressed air may flow into the annular space between the inner liner 1251 and the outer liner 1252 and into the annular space between the inner transition piece 1261 and the outer transition piece 1262 through the compressed air introduction hole (H). The compressed air introduced into the annular space can cool the inner liner 1251 and the inner transition piece 1261.

Meanwhile, the high-temperature and high-pressure combustion gas produced by the combustor 1200 is supplied to the turbine 1300 through the liner 1250 and the transition piece 1260. As the insulation expansion of the combustion gas is made in the turbine 1300, the combustion gas collides with a plurality of blades radially disposed on the rotary shaft of the turbine 1300 so that the thermal energy of the combustion gas is converted into mechanical energy that rotates the rotary shaft. A part of the mechanical energy obtained from the turbine 1300 is supplied as energy necessary for compressing the air in the compressor 1100, and the remaining energy is used as available energy to drive a generator to produce power.

The combustor 1200 may further include casing 1270 and an end cover 1231 coupled to accommodate compressed air (A) flowing to the burner module 1210. After the compressed air (A) flows into the annular space in the liner 1250 or the transition piece 1260 through the compressed air introduction hole (H), the flowing direction thereof is changed by the end cover 1231 to the inside of the fuel nozzle module 2000. The fuel can be supplied to the fuel nozzle module 2000 through a fuel flow path 1232 and can be mixed with the compressed air.

Referring to FIG. 3, the fuel nozzle module 2000 includes the plurality of fuel nozzles 2100, 2200, and 2300, and each of the fuel nozzles 2100, 2200, and 2300 can include a plurality of micro-mixers. The micro-mixer can be configured to include a mixing flow path 2101 and a fuel supply hole 2102.

The plurality of fuel nozzles 2100, 2200, and 2300 can be arranged radially on the upstream of the combustion chamber 1240, and a shroud 1234 is formed to surround the plurality of fuel nozzles 2100, 2200, and 2300. The shroud 1234 and the plurality of fuel nozzles 2100, 2200, and 2300 form the fuel nozzle module 2000.

Figure 4:
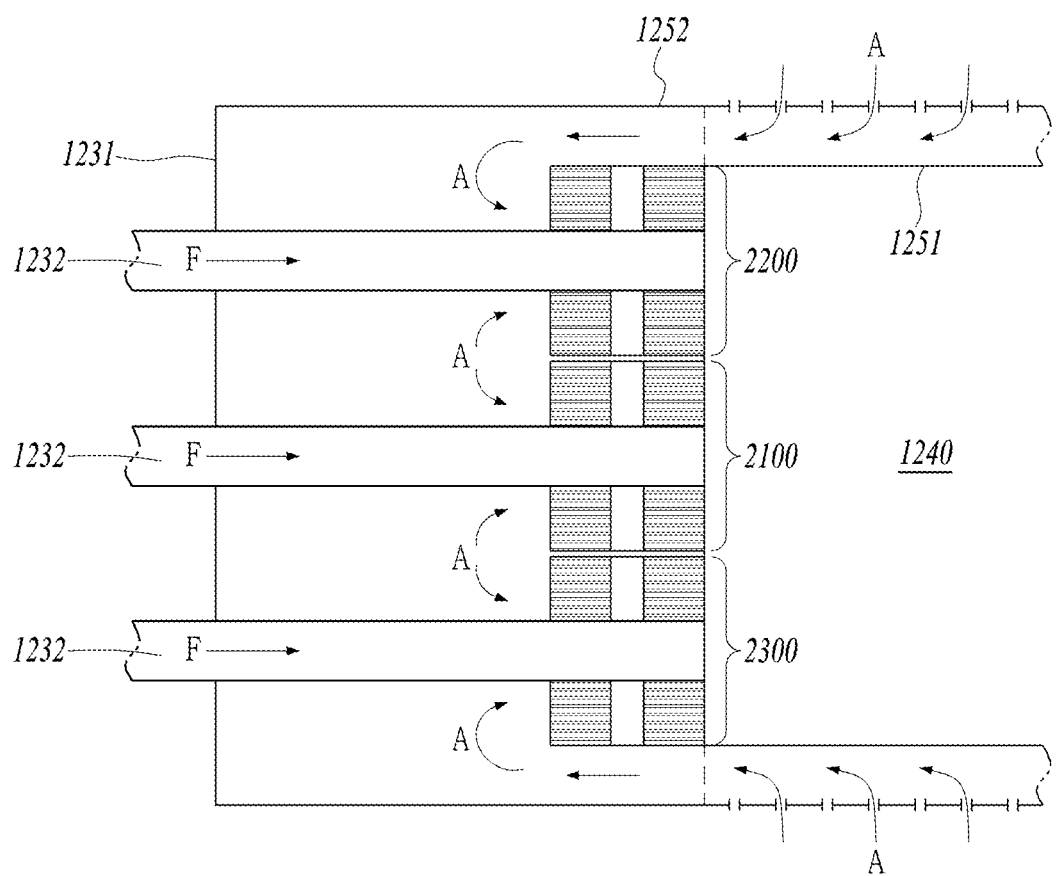
FIG. 4 is a cross-sectional diagram taken along line I-I' of FIG. 3 showing a fuel nozzle module according to an exemplary embodiment.
Figure 5:
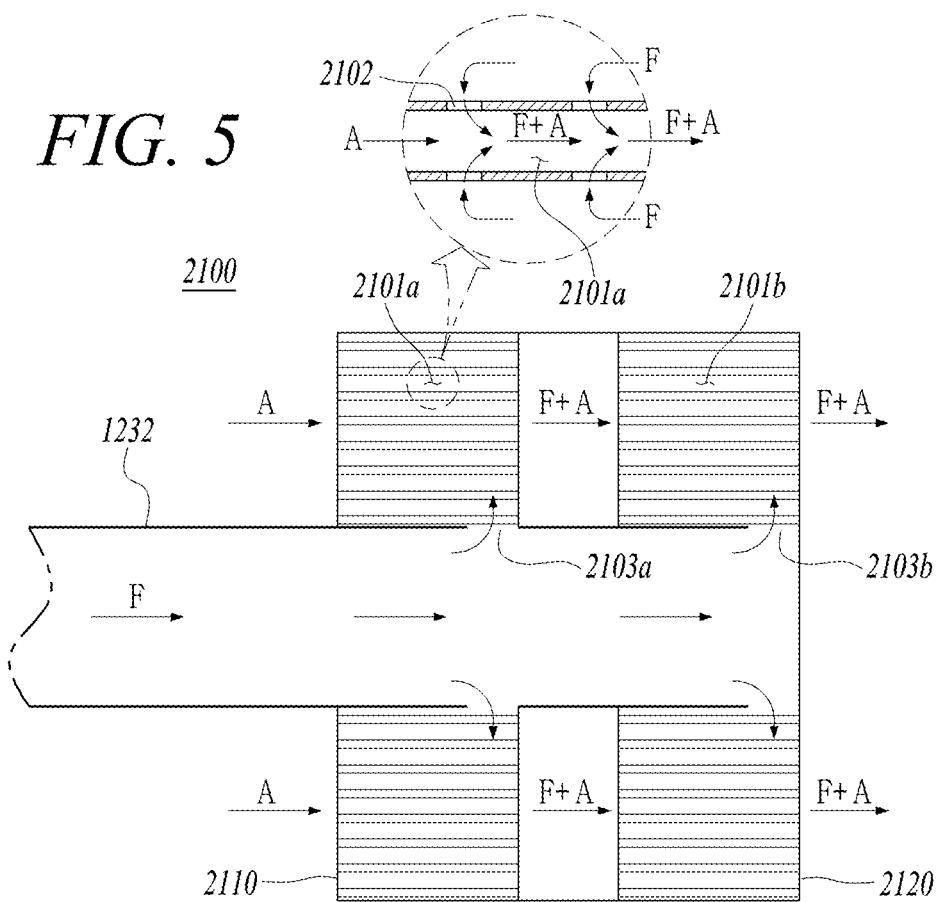
FIG. 5 is a cross-sectional diagram showing a fuel nozzle according to an exemplary embodiment.

FIG. 4 is a cross-sectional diagram taken along line I-I' of FIG. 3 showing the fuel nozzle module 2000 according to an exemplary embodiment, and FIG. 5 is a cross-sectional diagram showing a fuel nozzle 2100 according to an exemplary embodiment.

Referring to FIGS. 4 and 5, the fuel nozzle module 2000 includes the plurality of fuel nozzles 2100, 2200, and 2300, and each of the plurality of fuel nozzles 2100, 2200, and 2300 includes at least two fuel plenums 2110 and 2120. The at least two fuel plenums 2110 and 2120 can be formed on one fuel flow path 1232 to be spaced apart from each other.

Here, the plurality of fuel nozzles 2100, 2200, and 2300 can have the same shape, and the description of the fuel nozzle 2100 can be equally applied to the fuel nozzles 2200 and 2300.

A fuel (F) can be supplied to the fuel plenums 2110 and 2120 through the fuel flow path 1232 and can be introduced into the micro-mixer to be mixed with the compressed air (A). The fuel (F) can consist of only hydrogen, only natural gas, or a mixed firing that mixes the hydrogen and the natural gas.

For example, the compressed air (A) flows into a first mixing flow path 2101a formed in a first fuel plenum 2110, and the fuel (F) supplied through the fuel flow path 1232 flows into the first fuel plenum 2110 through a first plenum inlet 2103a and is supplied to the first mixing flow path 2101a through the fuel supply hole 2102 to be mixed with the compressed air (A) to become a first mixing fluid (F+A) to flow into a second fuel plenum 2120.

The first mixing fluid (F+A) flows into a second mixing flow path 2101b formed in the second fuel plenum 2120, and the fuel (F) supplied through the fuel flow path 1232 flows into the second fuel plenum 2120 through a second plenum inlet 2103b and is supplied to the second mixing flow path 2101b through the fuel supply hole 2102 to be mixed with the first mixing fluid (F+A) to become a second mixing fluid (F+A) to flow into the combustion chamber 1240.

For example, the first plenum inlet 2103a and the second plenum inlet 2103b may have different sizes. Therefore, because an amount of the fuel (F) flowing into each of the fuel plenums 2110 and 2120 is different, a fuel distribution ratio in the fuel plenums 2110 and 2120 can be different.

The fuel nozzle according to the exemplary embodiment includes at least two fuel plenums 2110 and 2120, and the fuel (F) flows therein through the plenum inlets 2103a and 2103b formed in each fuel plenum, and in this case, an amount of the fuel flowing into each of the plenum inlets 2103a and 2103b can be adjusted. In other words, during actual operation, an amount of fuel flowing into the first plenum inlet 2103a is different from an amount of fuel flowing into the second plenum inlet 2103b. As a result, the fuel distribution ratio to each of the fuel plenums 2110 and 2120 can be adjusted, and thus the fuel distribution ratio of the mixed fluid flowing into the combustion chamber 1240 through each fuel nozzle 2100, 2200, and 2300 can be different, and the number of high frequency of each fuel nozzle 2100, 2200, and 2300 generated by the fuel containing hydrogen can be different. Therefore, it is possible to solve the problem of combustion instability due to high-frequency resonance caused by the fuel containing hydrogen.

Figure 6:
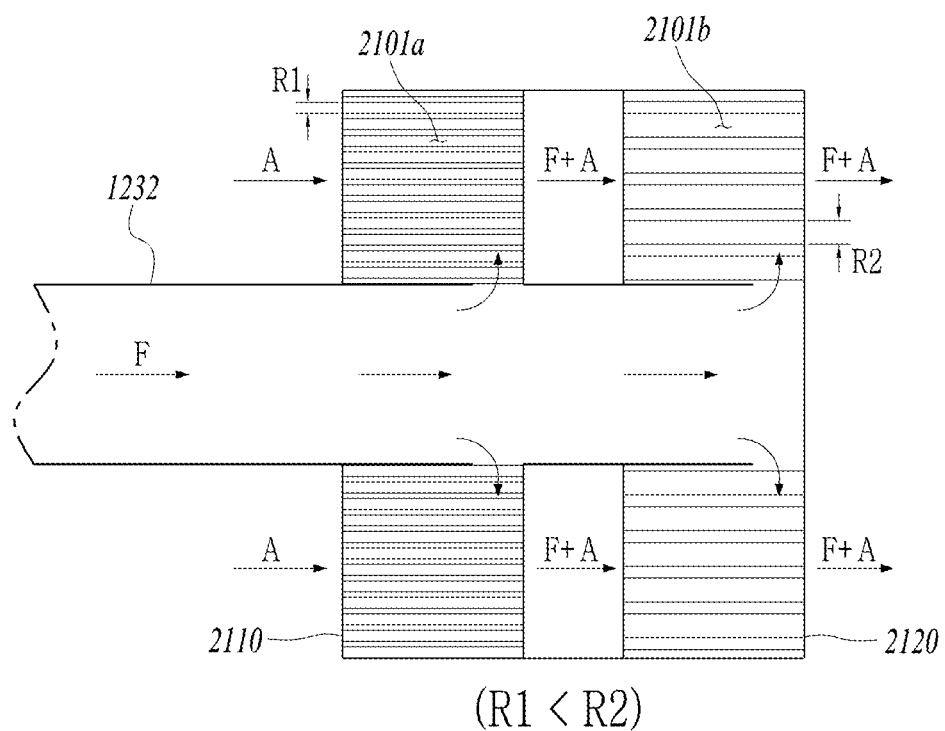
FIG. 6 is a cross-sectional diagram showing a modified example of the fuel nozzle according to another exemplary embodiment.

FIG. 6 is a cross-sectional diagram showing a modified example of the fuel nozzle according to an exemplary embodiment. Referring to FIG. 6, because the fuel nozzle according to the exemplary embodiment has the same structure as the fuel nozzle of FIG. 5 except that a diameter (R1) of the first mixing flow path 2101a and a diameter (R2) of the second mixing flow path 2101b is different, a redundant description of the same configuration will be omitted.

For example, the diameter (R1) of the first mixing flow path 2101a can be smaller than the diameter (R2) of the second mixing flow path 2101b. In this case, the first fuel plenum 2110 including the first mixing flow path 2101a and the second fuel plenum 2120 including the second mixing flow path 2101b may mix fluids, and each of the fuel plenums can perform other functions.

The first fuel plenum 2110 includes a mixing flow path having a small diameter to increase the speed of the mixed fluid so that the fluids can be mixed well. The second fuel plenum 2120 includes a mixing flow path having a large diameter to reduce the speed of the mixed fluid so that the flame in the combustion chamber 1240 can be maintained well.

FIGS. 7 to 10 are cross-sectional diagrams showing various forms of a fuel nozzle module according to another exemplary embodiment.

Exemplary embodiments of FIGS. 7 to 10 are to solve the problem of combustion instability due to the high-frequency resonance by adjusting the fuel distribution ratio in each fuel nozzle 2100, 2200, and 2300 so that the frequency of the high frequency in each fuel nozzle 2100, 2200, and 2300 is formed differently.

Referring to FIG. 7, each of the fuel nozzles 2100, 2200, and 2300 constituting the fuel nozzle module 2000 includes at least two fuel plenums 2110 and 2120, and an interval between the fuel plenums 2110 and 2120 of one fuel nozzle can be different from an interval between the fuel plenums of another fuel nozzle.

For example, at least one of an interval (L1) between the fuel plenums 2110 and 2120 constituting the first fuel nozzle 2100, an interval (L2) between fuel plenums 2210 and 2220 constituting a second fuel nozzle 2200, and an interval (L3) between fuel plenums 2310 and 2320 constituting a third fuel nozzle 2300 can be formed differently. FIG. 7 shows that all intervals are formed differently (i.e., L1≠L2≠L3).

Referring to FIGS. 8 to 10, each of the fuel nozzles 2100, 2200, and 2300 constituting the fuel nozzle module 2000 includes at least two fuel plenums 2110 and 2120, and each volume of the plurality of fuel plenums constituting at least one fuel nozzle can be formed differently.

For example, a volume (V1) of the first fuel plenum 2110 and a volume (V2) of the second fuel plenum 2120 constituting the first fuel nozzle 2100 can be formed differently. Preferably, the volume (V1) of the first fuel plenum 2110 can be formed larger than the volume (V2) of the second fuel plenum 2120.

FIG. 8 shows that in each of the fuel nozzles 2100, 2200, and 2300, the volumes (V1) of the first fuel plenums 2110, 2210, and 2310 are the same, and the volumes (V2) of the second fuel plenums 2120, 2220, and 2320 are the same, but the volumes (V1) of the first fuel plenums 2110, 2210, and 2310 are larger than the volumes (V2) of the second fuel plenums 2120, 2220, and 2320 (i.e., V1>V2).

FIG. 9 shows that in each of the fuel nozzles 2100, 2200, and 2300, the volumes (V2) of the second fuel plenums 2120, 2220, and 2320 are the same, but all volumes (V11, V12, and V13) of the first fuel plenums 2110, 2210, and 2310 are different (i.e., V11≠V12≠V13≠V2).

FIG. 10 shows that in each of the fuel nozzles 2100, 2200, and 2300, the volumes (V1) of the first fuel plenums 2110, 2210, and 2310 are the same, but all volumes (V21, V22, and V23) of the second fuel plenums 2120, 2220, and 2320 are different (i.e., V21≠V22≠V23≠V1).

The fuel nozzle module according to another exemplary embodiment can variously adjust the fuel distribution ratio of each of the fuel plenums by variously forming an interval between at least two fuel plenums constituting each of the fuel nozzles 2100, 2200, and 2300, a volume ratio of the fuel plenum, and the like. Therefore, the frequencies of the high frequency of each of the fuel nozzles 2100, 2200, and 2300 generated by the fuel containing hydrogen can be formed differently, thereby solving the problem of combustion instability due to the high-frequency resonance.

While one or more exemplary embodiments have been described with reference to the accompanying drawings, it will be apparent to those skilled in the art that various modifications and variations can be made through addition, change, deletion, or substitution of components without departing from the spirit and scope of the disclosure described in the appended claims, and these modifications and changes fall within the spirit and scope of the disclosure as defined in the appended claims.

What is claimed is:

1. A fuel nozzle comprising:
a fuel flow path through which a fuel flows; and
a plurality of fuel plenums, each of the plurality of fuel plenums comprising a plurality of micro-mixers,
wherein each of the plurality of micro-mixers comprises a mixing flow path through which a mixing fluid of the fuel and a compressed air flow and a fuel supply hole for supplying the fuel to the mixing flow path, wherein each of the plurality of micro-mixers extends from a respective upstream end with respect to the compressed air flow to a respective downstream end with respect to the compressed air flow,
wherein the plurality of fuel plenums are formed along the fuel flow path and separated from each other by a space,
wherein a first fuel plenum of the plurality of fuel plenums is upstream of a second fuel plenum of the plurality of fuel plenums, such that all of the mixing fluid discharged from the first fuel plenum passes through the space and is received by the second fuel plenum; and
wherein the mixing flow path of each of the plurality of micro-mixers in the first fuel plenum has a first diameter, which is constant from the respective upstream end to the respective downstream end of each of the plurality of micro-mixers in the first fuel plenum, the mixing flow path of each of the plurality of micro-mixers in the second fuel plenum has a second diameter, which is constant from the respective upstream end to the respective downstream end of each of the plurality of micro-mixers in the second fuel plenum, and the second diameter being different from the first diameter,
wherein a total count of the plurality of micro-mixers included in the first fuel plenum is defined to include every micro-mixer in the first fuel plenum and designated as a first number M, a total count of the plurality of micro-mixers in the second fuel plenum is defined to include every micro-mixer in the second fuel plenum and designated as a second number N (M, N being natural numbers), and the second number N is different from the first number M.

2. The fuel nozzle of claim 1, wherein the first diameter is smaller than the second diameter.

3. The fuel nozzle of claim 1,
wherein the fuel flow path extending into each of the plurality of fuel plenums, such that a first section of the fuel flow path is surrounded by the first fuel plenum, and a second section of the fuel flow path is surrounded by the second fuel plenum;
the first section of the fuel flow path comprises a first plenum inlet for flowing the fuel into the first fuel plenum from the fuel flow path, the second section of the fuel flow path comprises a second plenum inlet for flowing the fuel into the second fuel plenum from the fuel flow path, and a size of the first plenum inlet of the first fuel plenum is different from a size of the second plenum inlet of the second fuel plenum.

4. The fuel nozzle of claim 1, wherein the fuel comprising hydrogen.

5. The fuel nozzle of claim 1,
wherein, for the first fuel plenum, the respective upstream end and the respective downstream end of each of the plurality of micro-mixers define a first axial length, which is equal to a first distance between an upstream end and a downstream end of the first fuel plenum,
wherein, for the second fuel plenum, the respective upstream end and the respective downstream end of each of the plurality of micro-mixers define a second axial length, which is equal to a second distance between an upstream end to a downstream end of the second fuel plenum, and
the first axial length and the second axial length are different from each other.

6. A fuel nozzle module comprising:
a plurality of fuel nozzles; and
a shroud formed to surround the plurality of fuel nozzles,
wherein each of the plurality of fuel nozzles comprises:
a fuel flow path through which a fuel flows; and
a plurality of fuel plenums, each of the plurality of fuel plenums comprising a plurality of micro-mixers,
wherein, for each of the plurality of fuel nozzles, each of the plurality of micro-mixers comprises a mixing flow path through which a mixing fluid of the fuel and a compressed air flows and a fuel supply hole for supplying the fuel to the mixing flow path, and
wherein, for each of the plurality of fuel nozzles, each of the plurality of micro-mixers extends from a respective upstream end with respective to the compressed air flow to a respective downstream end with respective to the compressed air flow,
wherein, for each of the plurality of fuel nozzles, the plurality of fuel plenums are formed along the fuel flow path and separated from each other by a space,
wherein, for each of the plurality of fuel nozzles, a first fuel plenum of the plurality of fuel plenums is upstream of a second fuel plenum of the plurality of fuel plenums, such that all of the mixing fluid discharged from the first fuel plenum passes through the space and is received by the second fuel plenum; and
wherein, for each of the plurality of fuel nozzles, the mixing flow path of each of the plurality of micro-mixers in the first fuel plenum has a first diameter, which is constant from the respective upstream end to the respective downstream end of each of the plurality of micro-mixers in the first fuel plenum, the mixing flow path of each of the plurality of micro-mixers in the second fuel plenum has a second diameter, which is constant from the respective upstream end to the respective downstream end of each of the plurality of micro-mixers in the second fuel plenum, and the second diameter being different from the first diameter,
wherein, for each of the plurality of fuel nozzles, a total count of the plurality of micro-mixers included in the first fuel plenum is defined to include every micro-mixer in the first fuel plenum and designated as a first number M, a total count of the plurality of micro-mixers in the second fuel plenum is defined to include every micro-mixer in the second fuel plenum and designated as a second number N (M, N being natural numbers), and the second number N is different from the first number M.

7. The fuel nozzle module of claim 6,
wherein, for a first fuel nozzle of the plurality of fuel nozzles, a first interval is defined by the space separating the first fuel plenum and the second fuel plenum in the axial direction, and
wherein, for a second fuel nozzle of the plurality of fuel nozzles, a second interval is defined by the space separating the first fuel plenum and the second fuel plenum in the axial direction, and the first interval is different from the second interval.

8. The fuel nozzle module of claim 6,
wherein, for each of the plurality fuel nozzles, the first fuel plenum has a first volume and the second fuel plenum has a second volume, the first volume being different from the second volume.

9. The fuel nozzle module of claim 6,
wherein, for each of the plurality of the fuel nozzles, the fuel flow path extending into each of the plurality of fuel plenums, such that a first section of the fuel flow path is surrounded by the first fuel plenum, and a second section of the fuel flow path is surrounded by the second fuel plenum;
wherein, for each of the plurality of the fuel nozzles, the first section of the fuel flow path comprises a first plenum inlet for flowing the fuel into the first fuel plenum from the fuel flow path, the second section of the fuel flow path comprises a second plenum inlet for flowing the fuel into the second fuel plenum from the fuel flow path, and
wherein, for each of the plurality of fuel nozzles, a size of the first plenum inlet and a size of the second plenum inlet are different from each other.

10. The fuel nozzle module of claim 6, wherein the fuel comprising hydrogen.

11. The fuel nozzle module of claim 6,
wherein the first fuel plenum of a first fuel nozzle of the plurality of fuel nozzles has a first volume, the first fuel plenum of a second fuel nozzle of the plurality of fuel nozzles has a second volume, and the first fuel plenum of a third fuel nozzle of the plurality of fuel nozzles has a third volume, all of the first volume, the second volume, and third volume being different from each other.

12. A combustor comprising:
a combustion chamber assembly comprising a combustion chamber in which a mixing fluid is combusted; and
a fuel nozzle module comprising a plurality of fuel nozzles for injecting the mixing fluid into the combustion chamber and a shroud formed to surround the plurality of fuel nozzles,
wherein each of the plurality of fuel nozzles comprises:
a fuel flow path through which a fuel flows; and
a plurality of fuel plenums, each of the plurality of fuel plenums comprising a plurality of micro-mixers,
wherein, for each of the plurality of fuel nozzles, each of the plurality of micro-mixers comprises a mixing flow path through which a mixing fluid of the fuel and a compressed air flows and a fuel supply hole for supplying the fuel to the mixing flow path, and
wherein, for each of the plurality of fuel nozzles, each of the plurality of micro-mixers extends from a respective upstream end with respective to the compressed air flow to a respective downstream end with respective to the compressed air flow,
wherein, for each of the plurality of fuel nozzles, the plurality of fuel plenums are formed along the fuel flow path and separated from each other by a space,
wherein, for each of the plurality of fuel nozzles, a first fuel plenum of the plurality of fuel plenums is upstream of a second fuel plenum of the plurality of fuel plenums, such that all of the mixing fluid discharged from the first fuel plenum passes through the space and is received by the second fuel plenum; and
wherein, for each of the plurality of fuel nozzles, the mixing flow path of each of the plurality of micro-mixers in the first fuel plenum has a first diameter, which is constant from the respective upstream end to the respective downstream end of each of the plurality of micro-mixers in the first fuel plenum, the mixing flow path of each of the plurality of micro-mixers in the second fuel plenum has a second diameter, which is constant from the respective upstream end to the respective downstream end of each of the plurality of micro-mixers in the second fuel plenum, and the second diameter being different from the first diameter,
wherein, for each of the plurality of fuel nozzles, a total count of the plurality of micro-mixers included in the first fuel plenum is defined to include every micro-mixer in the first fuel plenum and designated as a first number M, total count of the plurality of micro-mixers in the second fuel plenum is defined to include every micro-mixer in the second fuel plenum and designated as a second number N (M, N being natural numbers), and the second number N is different from the first number M.

13. The combustor of claim 12,
wherein, for a first fuel nozzle of the plurality of fuel nozzles, a first interval is defined by the space separating the first fuel plenum and the second fuel plenum in the axial direction, and
wherein, for a second fuel nozzle of the plurality of fuel nozzles, a second interval is defined by the space separating the first fuel plenum and the second fuel plenum in the axial direction, and
the first interval is different from the second interval.

14. The combustor of claim 12,
wherein, for each of the plurality fuel nozzles, the first fuel plenum has a first volume and the second fuel plenum has a second volume, the first volume being different from the second volume.

15. The combustor of claim 12,
wherein, for each of the plurality of the fuel nozzles, the fuel flow path extending into each of the plurality of fuel plenums, such that a first section of the fuel flow path is surrounded by the first fuel plenum, and a second section of the fuel flow path is surrounded by the second fuel plenum;
wherein, for each of the plurality of the fuel nozzles, the first section of the fuel flow path comprises a first plenum inlet for flowing the fuel into the first fuel plenum from the fuel flow path, the second section of the fuel flow path comprises a second plenum inlet for flowing the fuel into the second fuel plenum from the fuel flow path, and
wherein, for each of the plurality of fuel nozzles, a size of the first plenum inlet and a size of the second plenum inlet are different from each other.

16. The combustor of claim 12, wherein the fuel comprising hydrogen.

* * * * *